US006987344B2

(12) United States Patent
White et al.

(10) Patent No.: US 6,987,344 B2
(45) Date of Patent: Jan. 17, 2006

(54) HIGH POWER ROTARY TRANSFORMER WITH BUS DUCT ASSEMBLY

(75) Inventors: Michael Walter White, Peterborough (CA); Bruce William Mills, Peterborough (CA); Robert Henry Rehder, Peterborough (CA)

(73) Assignee: General Electric Canada Inc., Mississauga (CA)

( * ) Notice: Subject to any disclaimer, the term of this patent is extended or adjusted under 35 U.S.C. 154(b) by 269 days.

(21) Appl. No.: 10/366,421

(22) Filed: Feb. 14, 2003

(65) Prior Publication Data

US 2003/0178910 A1 Sep. 25, 2003

(30) Foreign Application Priority Data

Mar. 21, 2002 (CA) ............................................. 2377849

(51) Int. Cl.
*H01R 39/08* (2006.01)

(52) U.S. Cl. ...................... 310/232; 310/219; 310/112; 310/114; 310/231; 310/220
(58) Field of Classification Search ......... 310/112–114, 310/232, 71, 219, 231
See application file for complete search history.

(56) References Cited

U.S. PATENT DOCUMENTS

| | | | | |
|---|---|---|---|---|
| 1,683,676 A | * | 9/1928 | Jungk ........................ 310/232 |
| 2,696,570 A | * | 12/1954 | Pandapas .................... 310/232 |
| 2,950,403 A | * | 8/1960 | Kilner et al. ............... 310/232 |
| 2,978,600 A | * | 4/1961 | Silverman .................. 310/232 |
| 3,353,041 A | * | 11/1967 | Little ......................... 310/43 |
| 3,471,708 A | | 10/1969 | Rauhut et al. .............. 307/65 |
| 3,686,514 A | * | 8/1972 | Dube et al. ................. 310/232 |
| 4,621,211 A | * | 11/1986 | Spirk ......................... 310/232 |
| 5,346,432 A | | 9/1994 | Amborn et al. |
| 5,625,511 A | | 4/1997 | Brooks et al. |
| 5,742,515 A | | 4/1998 | Runkle et al. ............ 290/40 C |
| 5,777,408 A | * | 7/1998 | Brem ......................... 310/71 |
| 5,841,267 A | | 11/1998 | Larsen ....................... 323/215 |
| 5,952,816 A | | 9/1999 | Larsen ....................... 323/215 |
| 5,953,225 A | * | 9/1999 | Larsen ....................... 363/174 |
| 6,356,472 B1 | * | 3/2002 | Runkle et al. ............. 363/170 |
| 6,465,926 B2 | | 10/2002 | Rehder et al. ............. 310/227 |
| 6,469,414 B2 | | 10/2002 | Rehder et al. ............. 310/232 |
| 6,472,791 B1 | | 10/2002 | Rehder et al. ............. 310/232 |

FOREIGN PATENT DOCUMENTS

| | | |
|---|---|---|
| CA | 2351895 A1 | 12/2001 |
| FR | 1466779 A | 1/1967 |

* cited by examiner

*Primary Examiner*—Darren Schuberg
*Assistant Examiner*—Yahveh Comas

(57) ABSTRACT

A rotary transformer has a bus duct assembly that extends through the hollow shaft of a rotary transformer from collector or slip rings positioned above a drive motor for the rotary transformer to end windings of the rotor positioned most remote from the drive motor. By positioning the leads of the bus duct connection with the rotor end windings on the rotor end windings most remote form the drive motor, the shaft strength and integrity is not reduced due to the torque applied by the drive motor. Further, the shaft is formed from two coupled shaft sections and the bus duct assembly comprises two L shaped sections each positioned substantially within a corresponding shaft section. The bus duct sections are interconnected to complete the bus duct assembly making it simpler to remove the first or upper shaft section from the second or lower shaft section during field servicing. Further, the use of the two bus duct sections within the shaft coupled together simplifies assembly of each bus duct section within its corresponding shaft section.

20 Claims, 5 Drawing Sheets

HIGH POWER ROTARY TRANSFORMER WITH BUS DUCT ASSEMBLY

FIELD OF THE INVENTION

The present invention relates to a high power rotary transformer having a bus duct assembly mounted within the rotating shaft of the transformer.

BACKGROUND OF THE INVENTION

A high power rotary transformer may be utilized to transform electrical power from one power grid operating at one frequency to a second power grid operating at a second frequency. U.S. Pat. No. 5,953,225 issued Sep. 14, 1999 to Larsen discloses a rotary transformer that includes a power recovery system to recover and apply to the transferee grid a power differential attributable to mechanical power channeled to a rotatable shaft of the rotary transformer.

Another such rotary transformer assembly is disclosed in Canadian patent application serial number 2,351,895 published Dec. 30, 2001 to Martin and Rehder. This rotary transformer assembly utilizes three phases of isolated bus duct passing through the center of the rotating shaft to connect the rotor of the rotary transformer to one of the two power systems between which the rotary transformer transforms the electrical power from one system through a stator to the other system operating at a slightly different frequency. The shaft assembly has a first upper shaft section or part containing radial holes at the top and bottom of this assembly through which lead ends of the bus duct radially pass 120 degrees from each other. The bus duct leads pass through exit holes in the upper portion of the upper shaft for connection with the collector rings to thereby connect this bus duct to a first power grid system. Similar exit holes are located at the bottom of this upper shaft section through which the lower bus duct leads radially pass for connection to the rotor winding of the rotary transformer. Both sets of exit holes are contained within the first upper shaft section. Below the first upper shaft section is a second lower shaft section. Both shaft sections are coupled together by a coupling flange. The rotor of the rotary transformer is supported on the lower shaft section.

The power recover system includes a drive motor connected to the upper shaft section between the two sets of leads of the bus duct. The motor applies torque to the upper shaft portion to recover power.

While the use of the bus duct passing through the upper shaft section of the rotating shaft has advantages associated with magnetic shielding, associated heating of the shaft and prevention of arcing, it should be understood that this bus duct assembly is fully contained within the upper shaft section between the collector ring and the upper end windings of the rotary. As a result, the full rated torque of the drive motor passes through a portion of the first upper shaft section between the two sets of radially extending bus duct exit holes cut through the shaft wall. The drive motor connection to the shaft is very close to the lower set of exit holes. Further this lower set of exit holes are located radially on the same plane. It should also be understood that for a high power application, the bus duct requires a diameter per phase in the order of 15 inches and the shaft has a diameter of about 54 inches. This leaves insufficient material in the shaft wall where the exit holes are cut to safely transmit the torque from the drive motor to the rotor of the rotary transformer. These holes create enormous stress concentrations in the shaft where the torquing movement of the drive motor is applied that must be compensated with very expensive and exotic steels. The steel shaft requires a relatively large thickness to counter the stress concentrations in the shaft to provide the strength necessary to transmit the torque. In some instances this may also increase the thickness of the shaft wall by up to 3 inches. These modifications to the upper shaft section are needed to compensate for a shaft that might otherwise be damaged, weakened, or broken during a short circuit of the drive motor or other short circuit conditions.

SUMMARY OF THE INVENTION

The present invention relates to a bus duct assembly for use in a rotary transformer that does not significantly weaken the shaft structure adjacent the drive motor of the rotary transformer thereby eliminating or reducing the requirement for the use of exotic steels of relatively increased wall thickness.

The present invention relates to a bus duct assembly that may be readily mounted within the shaft or any enclosed structure in which the bus duct extends axially therewith.

The present invention relates to a rotary transformer having a shaft and a bus duct assembly where the bus duct extends throughout the hollow shaft of a rotary transformer from collector rings positioned above a drive motor for the rotary transformer to end windings of the rotor positioned most remote from the drive motor. By having the lower exit openings for the bus duct positioned below the rotor of the rotary transformer, the strength of the shaft adjacent the drive motor connection thereto is not compromised by bus duct exit holes.

It is also within the realm of the present invention to provide a bus duct assembly that is formed from two L shaped sections whose leads are each respectively mounted through a corresponding set of exit holes in a corresponding shaft portion with the longer leg of the L of each section extending axially parallel to the shaft axis and being interconnected. By having interconnecting bus duct, it is simpler to remove the upper shaft section during field servicing because the bus duct assembly unplugs. Further, the use of two bus duct sections within the shaft coupled together simplifies assembly of each bus duct section within its corresponding shaft section. Another advantage with the bus duct assembly is that the flexible connections between the bus duct and the windings of the rotary transformer rotor do not need to be disconnected prior to removal of the upper shaft. Instead the electrical connection between the bus duct and the rotor winding is automatically accomplished by the disconnection of the bus duct sections. The flexible connections and all the connections underneath the rotor on the rotary transformer between the bus duct and the rotor can remain connected when the upper shaft is removed. This is a significant time saving feature for field servicing.

Preferably, the shaft coupling and the bus duct plug are located in close proximity to each other along the shaft axis for visual manufacturing and on site service inspection.

In one aspect, the present invention relates to a rotary transformer system for transferring power between a first grid and a second grid. The first grid operates at a first power wattage and a first electrical frequency and the second grid operating at a second electrical frequency. The system comprises a rotatable shaft, a drive motor, a rotor assembly, a stator assembly, a slip ring assembly and a bus duct assembly. The drive motor is connected to the rotatable shaft to drive the shaft proportional to power compensation between the first and second grids. The rotor assembly has a rotor connected with the rotatable shaft on a first side of the drive motor connection to the rotatable shaft. The rotor assembly has rotor end windings extending axially from opposing ends of the rotor with the first rotor end windings axially positioned adjacent the drive motor and with the second rotor end windings axially positioned remote from the drive motor. The stator assembly surrounds the rotor and has stator windings electrically connected with the second grid. The slip ring assembly is mounted to the rotatable shaft and is electrically connected to the first grid. The bus duct assembly is mounted within the rotatable shaft and extends therealong between the slip ring assembly and the second rotor end windings positioned remote from the drive motor to electrically interconnecting the slip ring assembly to the second rotor end windings positioned remote from the drive motor.

In a preferred aspect of the present invention, the rotary transformer system has a rotatable shaft comprising at least first and second axially extending sections coupled together to form the shaft. The slip ring assembly is connected to the first shaft section. The rotor is connected to the second shaft section. The bus duct assembly includes first and second bus duct sections axially extending substantially within the first and second shaft sections. Each of the first and second bus duct sections are interconnected within one of the shaft sections.

Preferably, one of the first and second bus duct sections extends beyond its corresponding shaft section into the other shaft section such that the plug assembly is located in one of the first and second shaft sections. The first and second bus duct sections are L shaped sections whose corresponding first and second end leads are respectively mounted through a corresponding set of exit holes in the corresponding first or second shaft sections. The shaft coupling and the bus duct interconnection are located in close axially proximity to each other.

BRIEF DESCRIPTION OF THE DRAWINGS

For a better understanding of the nature and objects of the present invention reference may be had to the accompanying diagrammatic drawings in which:

BRIEF DESCRIPTION OF THE DRAWINGS

Figure 1:
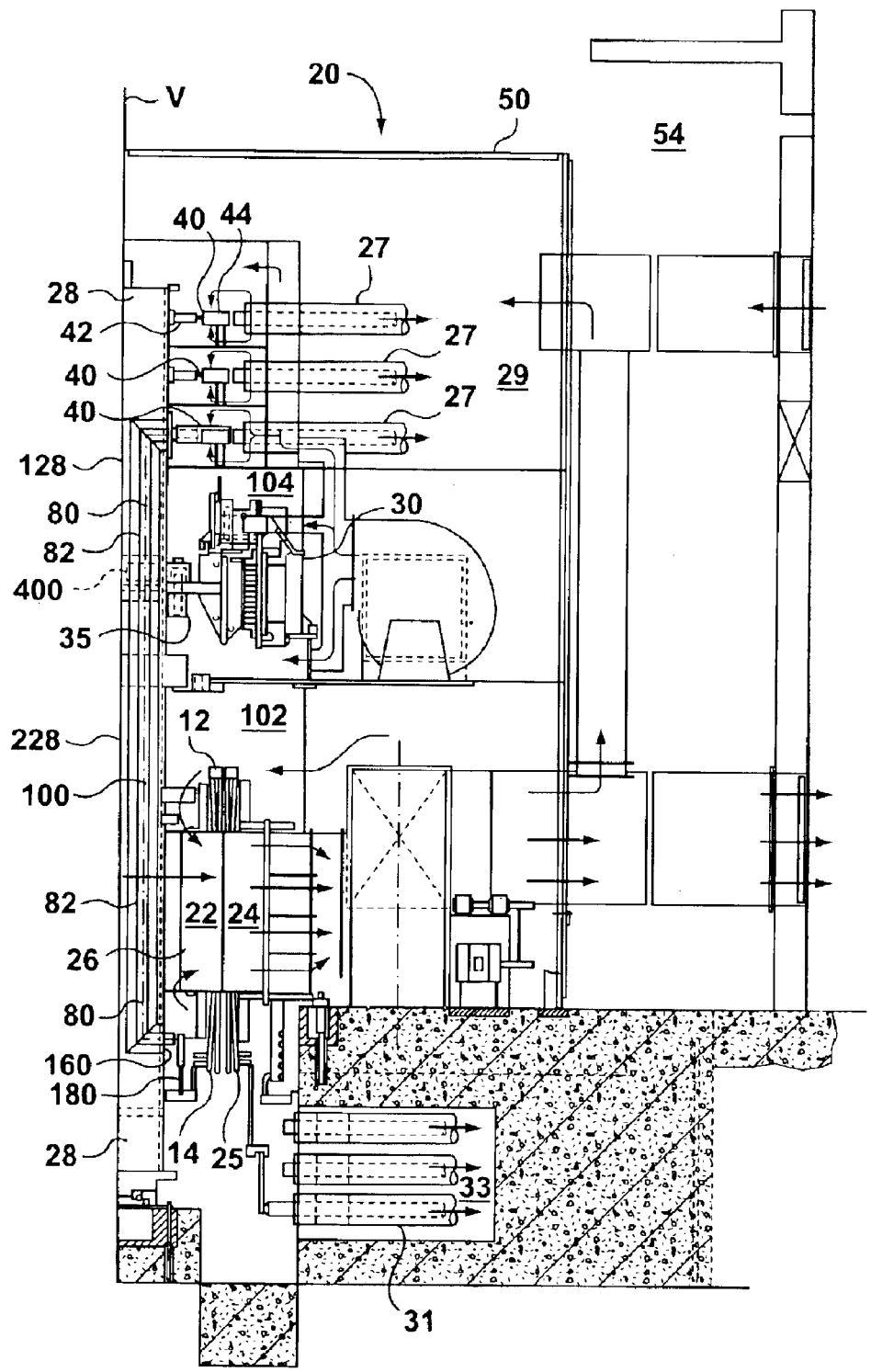

FIG. 1 is a side sectional view of an example rotating transformer system according to an embodiment of the invention.

Figure 2:
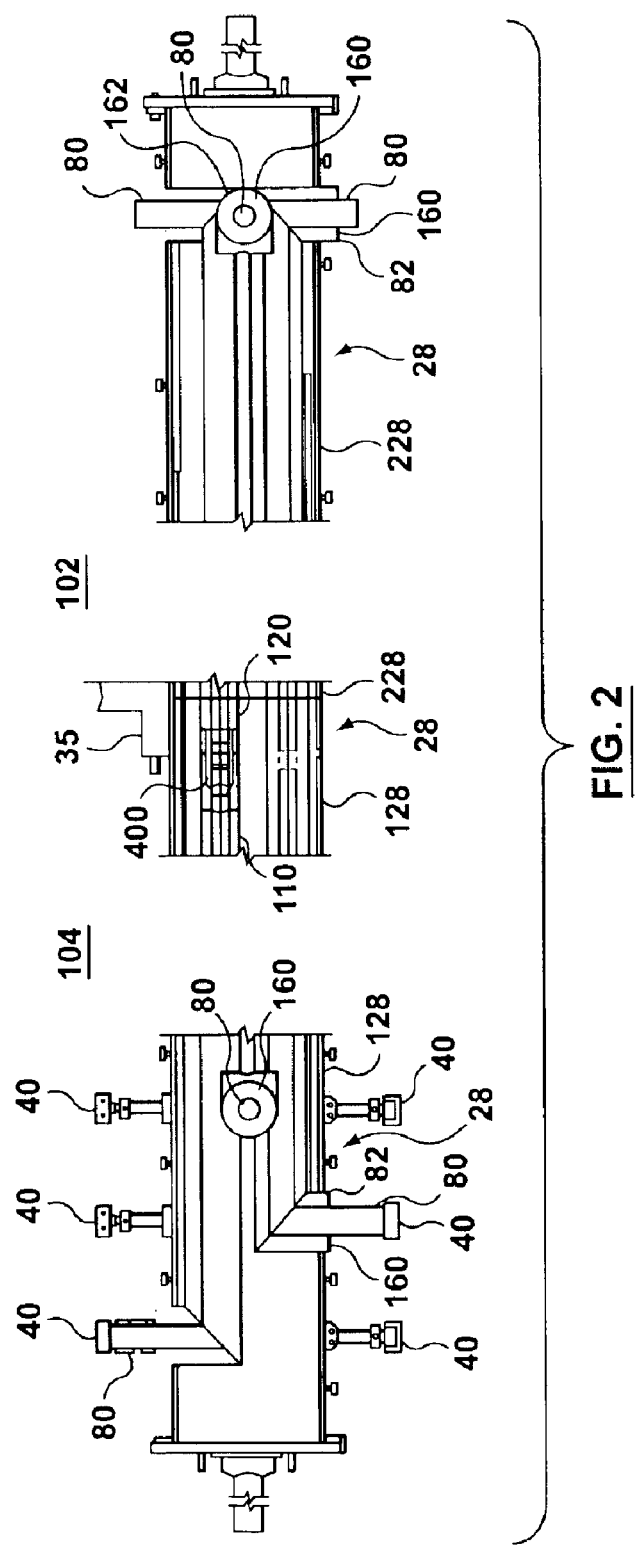

FIG. 2 is a side sectional view of a shaft assembly of the rotating transformer system of FIG. 1.

Figure 3:
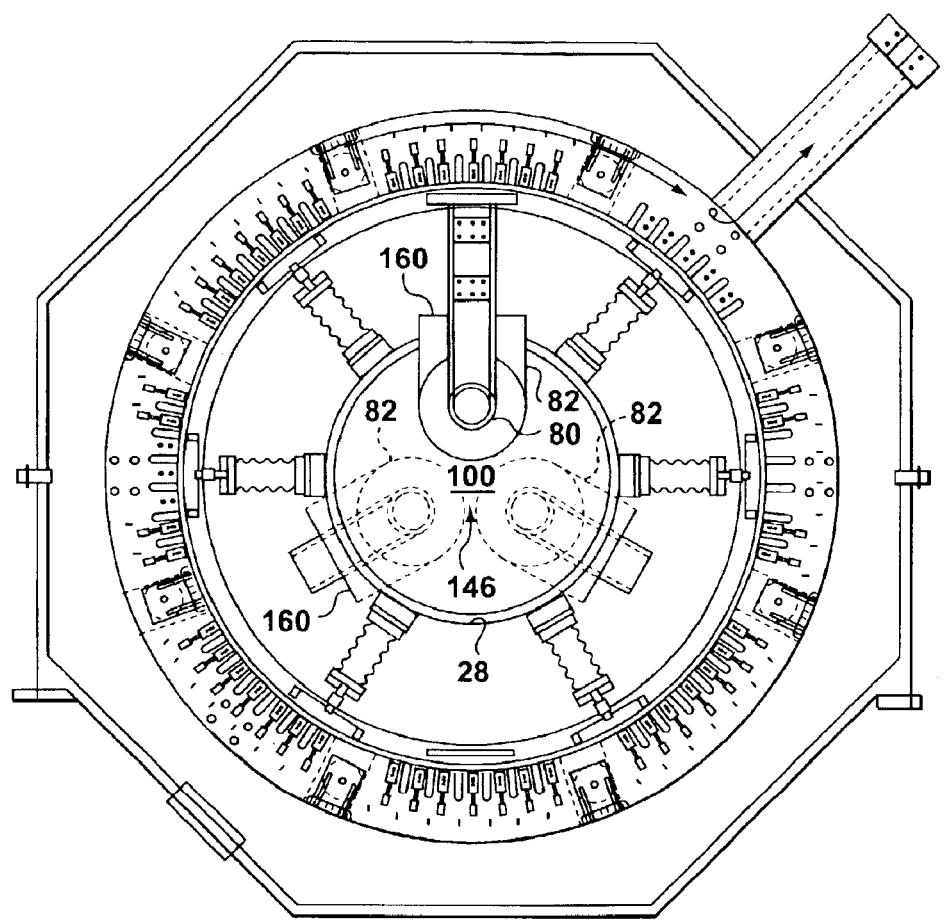

FIG. 3 is a top sectional view of the rotating transformer system of FIG. 1.

Figure 4A:
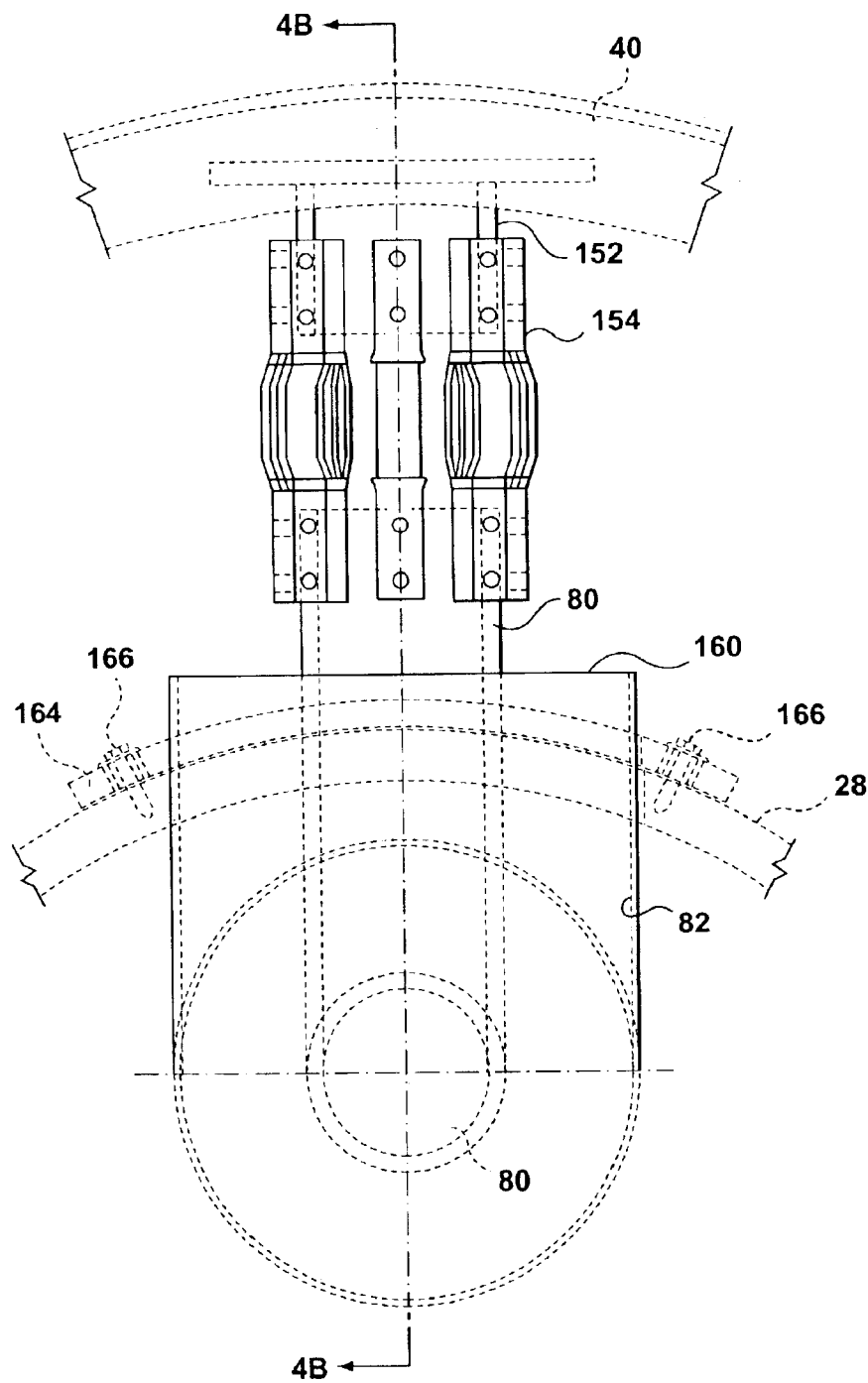

FIG. 4A is a sectional view of a portion of the rotary transformer system of FIG. 1, showing a bus conductor and its corresponding three phase isolated bus duct.

Figure 4B:
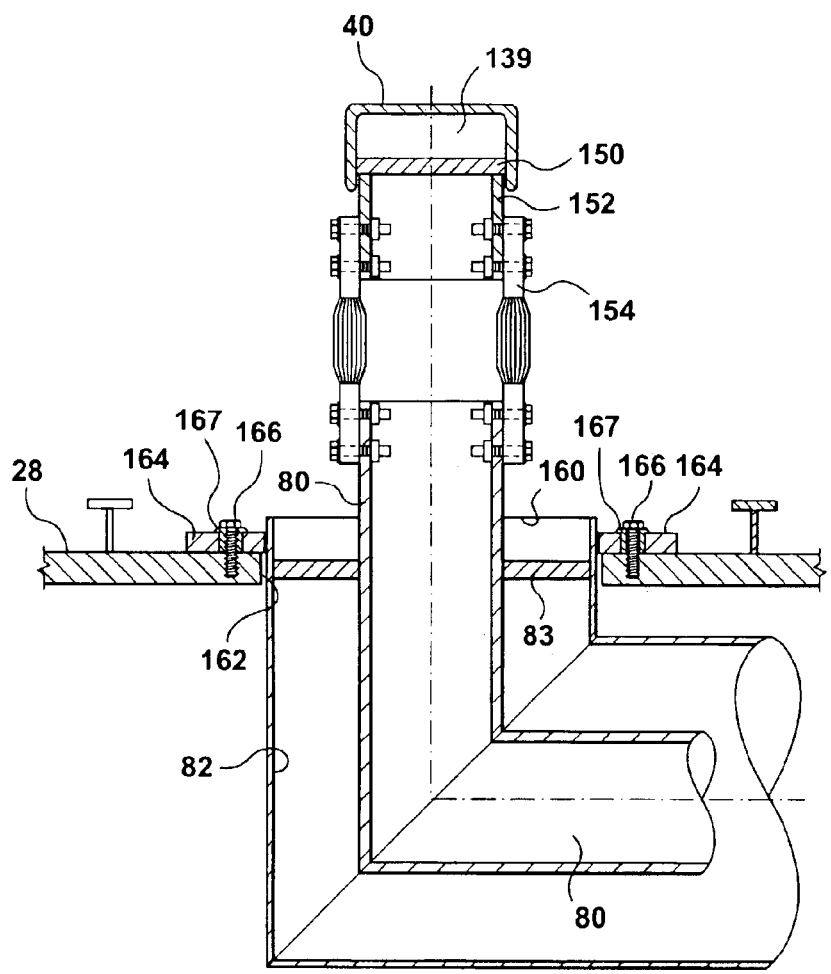

FIG. 4B is a sectioned view taken along line 4B—4B of FIG. 4A.

DETAILED DESCRIPTION OF THE INVENTION

Referring to FIG. 1 there is shown a rotary transformer 20 which includes both the rotor assembly 22 and a stator 24. The rotor assembly 22 includes a rotor core section 26, first and second rotor end windings 12, 14, slip rings or collector rings 40, and a rotatable shaft 28. Rotor assembly 22 is rotatable about a vertical axis V of its rotatable shaft 28 in both a clockwise direction and the counter-clockwise direction. Rotation of rotor assembly 22 is effected by a drive motor 30. It should be understood that while the preferred embodiment shows a vertically orientated rotary transformer, the orientation of the rotary transformer may be along another axis such as, for example, a horizontal axis.

The rotary transformer 20 is a high voltage, high current environment of alternating voltage and current. Rotary transformer system 20 is connected to transfer electrical power between first electrical system (example first electrical grid) and a second electrical system (for example a second electrical grid). The first electrical grid operates at a first power and first frequency and the second electrical grid operates at a second frequency.

In this environment, the rotor assembly 22 is connected by three phase lines of the bus ducts 27 of the first electrical system 29 and the stator windings 25 are connected to the bus ducts 31 of the second electrical system 33. Only one connection of the stator winding 25 to bus duct 31 is shown for simplicity. It should be understood that the first and second electrical systems 29, 33 are shown as the end portions of respective bus ducts 27 and 31. In the environment of the rotary transformer 20, it should be understood that the electrical grids 29, 33 would be continuations of the bus ducts 27, 31 within the building structure 54. Moreover, while bus duct 31 are shown spaced vertically, these bus duct 31 could alternatively be spaced horizontally apart.

Drive motor 30 rotates the rotor assembly 22 in response to a drive signal generated by an unillustrated control system. The first and second electrical systems 29, 33 may have a different electrical characteristic such as frequency or phase. The control system is bi-directionally operable to rotate the rotary transfer system at a variable speed for transferring power from the first electrical system to the second electrical system or vice versa.

In FIG. 1, the collector system is positioned at the top of the rotor assembly 22 and comprises slip rings 40, insulators 42 that support the slip rings 40; and a brush rigging assembly 44 that supports the brushes. The collector system has three slip rings 40, one for each phase. There are three corresponding brush rigging assemblies 44. Three phase lines leading from bus ducts of the first electrical system 29 are connected to a respective one of assemblies 44 of collector system of rotor assembly 22. Other three phase lines 31 are connected to the other electrical system 33 and to stator windings 25. The illustrated slip rings 40 are rated for 17 kV.

The rotary transformer 20 is enclosed in a thermally insulated housing 50. The housing 50 is, in turn, typically situated in a building 54. The center line in FIG. 1 which corresponds to axis V depicts the fact that only a right side of rotary transformer system 20 is illustrated in FIG. 1. It should be understood that only a portion of the structure is shown and that mirror images of the Illustrated portions extend to the left of axis V.

The slip rings 40 of the three phase planes are electrically connected to their respective windings on rotor assembly 22 by the bus conductors 80. The bus conductors 80 extend through respective three phase isolated bus ducts 82 formed interiorly in rotatable shaft 28. Referring to FIG. 3, the bus ducts 82 have an air buffer 146 provided therebetween (e.g., the bus ducts 82 are not in physical contact, but are spaced apart and separated by air). In the illustrated example embodiment, the bus conductors 80 are tubular in shape, but other shapes can be utilized (e.g., boxed shape). A disc insulator 83 (FIG. 4B) is situated a few inches inside the mouth 160 of each bus duct 82, fitting around the corresponding bus conductor 80 to seal the bus system so, e.g., air does not pass into the bus system (see FIG. 4B).

As shown in FIG. 4A and FIG. 4B, the slip ring 40 interior channel 139 has an electrically conductive plate 150 formed to bridge slip ring 40. The conductive plate 150 has a cylindrically shaped conductive extension 152 extending radially interiorily from slip ring 40 toward rotatable shaft 28. A first end of the bus conductor 80 for each phase plane is secured to extension 152, and hence to conductive plate 150 and thus to slip ring 40, by a flexible connector 154. A second end of the bus conductor 80 for each phase plane is connected to a rotor winding on rotor assembly 22 for the respective phase.

From their attachments to flexible connector 154, each bus conductor 80 extends radially toward rotatable shaft 28, entering a mouth 160 of its respective three phase isolated bus duct 82. Upon entry into mouth 160, the bus conductor 80 travels a short distance radially (with respect to the interior of rotatable shaft 28) through a first radial segment of its respective bus duct 82, and then makes an essentially ninety degree bend to travel through an axial segment of the bus duct 82. As understood with reference to FIG. 2, the bus conductor 80 then again bends into a second radial segment of bus duct 82, from which bus conductor 80 emerges through an annulus 162.

As further understood from FIG. 4A and FIG. 4B, the mouth 160 and annulus 162 of each bus duct 82 extends through a cover plate 164. The cover plate 164 is secured by fasteners 166 through insulated spacers 167 and is held slight aloft above the circumference of rotatable shaft 28, thereby insulating cover plate 164 from rotatable shaft 28.

As understood from the foregoing, each phase conductor 80 is in its own grounded metal enclosure, e.g., bus duct 82. The isolated phase bus ensures that any fault or electrical failure or arc-over will occur first to ground before becoming a phase to phase fault. As most systems are ground fault current limited, damage is minimized.

The improvements in the present invention are best described with reference to FIGS. 1 and 2 and in particular to the bus duct assembly 100. In FIG. 1, the rotor assembly 22 has a rotor 26 connected with the rotatable shaft 28 on a first side 102 of the drive motor 30 connection to the rotatable shaft 28. The rotor assembly has rotor end windings 12, 14 that extend axially from opposing ends of the rotor 22 with the first rotor end windings 12 axially positioned adjacent the drive motor 30 and with the second rotor end windings 14 axially positioned remote from the drive motor 30. The slip ring assembly 40 is mounted to the rotatable shaft 28 on a second side 104 of the drive motor 30 connection to the shaft 28, which is opposite to the first side 102.

The bus duct assembly 100 is mounted within the rotatable shaft 28 as described above and extends axially along the shaft 28 between the slip ring assembly 40 and the second rotor end windings 14 to electrically interconnect the slip ring assembly 40 to the second rotor end windings 14 positioned remote from the drive motor 30. The connection of the bus duct 80 to the rotor end winding 14 is through supports 180. This connection on the winding 14 increases the distance the bus duct 80 extends. The bus duct 80 now extends through both upper and lower shaft sections 128, 228. The three exit openings 160 cut through the shaft 28 on the same plane are located adjacent the rotor windings 14 and distanced from drive motor 30 connection to the shaft 28. It should be understood that only one bus duct 82 and exit opening 160 is shown in FIG. 1 and as best seen in FIG. 3, that in practice, three exit openings 160 are located on the same plane passing through shaft 28 at radial angled spacings preferably of 120° apart. Hence these three lower exit openings 180 are not located in the torque carry portion of the shaft, 28 adjacent the motor coupling 35. In otherwords, the lower exit openings in the shaft 28 (FIG. 1) associated with mouths 160 (FIG. 2) is in a relatively stress free zone.

The improved mechanical stress free connection of the bus duct 80 through openings 160 to the lower rotor end winding 14 results in an increased axial length of bus duct 80. To better accommodate the manufacture and field servicing of the shaft 28 and increased length of bus duct 80, the shaft 28 comprises an assembly of an upper shaft section 128 and a lower shaft section 228. The upper shaft 128 is coupled to lower shaft 228 in combination with shaft coupling 35 for the torque of drive motor 30. Also the bus duct 80 comprises an assembly 100 of two corresponding sections 110 and 120 (see FIG. 2). The bus duct sections 110 and 120 substantially extend within corresponding shaft sections 128 and 228. The bus duct sections 110 and 120 are coupled by an interconnection assembly shown generally at 400. This interconnection assembly may comprise any suitable plug type interconnection involving tabs or a series of spring loaded finger contacts extending around the inner conductor 80 of the bus duct 82 to interconnect the two bus duct sections. For a more detailed description of the bus duct coupling assembly 400, reference may be had to Applicant's corresponding Canadian patent application serial number 2,377,853 filed Mar. 21, 2002 (Docket GECAN 3234) filed concurrently herewith and assigned to the same assignee as the present application.

It should be understood that alternative embodiments of the present invention may be readily apparent to a person skilled in the art in view of the above description for the preferred embodiments of this invention. Accordingly, the scope of the present invention should not be limited to the teachings of the preferred embodiments and should be limited to the scope of the claims that follow.

What is claimed is:

1. A rotary transformer comprising:

a rotatable shaft;

a drive motor connected to the rotatable shaft to drive the shaft;

a rotor assembly having a rotor connected with the rotatable shaft on a first side of the drive motor connection to the rotatable shaft, the rotor assembly having rotor end windings extending axially from opposing ends of the rotor with the first rotor end windings axially positioned adjacent the drive motor and with the second rotor end windings axially positioned remote from the drive motor;

a stator assembly surrounding the rotor;

a slip ring assembly mounted to the rotatable shaft, a bus duct assembly mounted within the rotatable shaft comprising three phases of isolated bus where each phase of isolated bus comprises an interior bus conductor surrounded by an outer housing, the bus duct assembly extending along the rotatable shaft between the slip ring assembly and the second rotor end windings positioned remote from the drive motor to electrically interconnect the slip ring assembly to the second rotor end windings positioned remote from the drive motor, and the bus duct assembly comprising first end leads extending through openings in the shaft axially adjacent the second rotor end windings positioned remote from the drive motor for connection with the second rotor end windings.

2. The rotary transformer of claim 1 wherein the first end leads extend radially on the same plane through the openings in the shaft.

3. The rotary transformer of claim 1 wherein the slip ring assembly is mounted to the rotatable shaft on a second side of the drive motor connection to the shaft opposite to the first side and wherein the bus duct extends through the shaft and the connection of the drive motor to the shaft.

4. The rotary transformer of claim 3 wherein the bus duct assembly further includes second end leads radially extending through openings in the rotatable shaft on the second side of the drive motor for connection with the slip ring assembly.

5. The rotary transformer of claim 1 wherein the bus duct has a tubular shape.

6. The rotary transformer of claim 1 wherein the rotatable shaft comprises at least first and second axially extending shaft sections coupled together to form said shaft, and wherein:

the slip ring assembly is connected to the first shaft section;

the rotor is connected to the second shaft section; and the bus duct assembly includes first and second bus duct sections axially extending substantially within the first and second shaft sections, each of the first and second bus duct sections being interconnected within one of the shaft sections.

7. The rotary transformer of 6 claim wherein one of the first and second bus duct sections extends beyond its corresponding shaft section into the other shaft section such that the bus duct interconnection is located in one of the first and second shaft sections.

8. The rotary transformer of claim 7 wherein the first and second bus duct sections are L shaped sections whose corresponding first and second end leads are respectively mounted through a corresponding set of exit holes in the corresponding first or second shaft sections.

9. The rotary transformer of claim 6 wherein the shaft sections are coupled together in combination with the drive motor section to the shaft.

10. The rotary transformer of claim 6 wherein the shaft sections are coupled together in close axial proximity to the bus duct interconnection.

11. A rotary transformer system for transferring power between a first grid and a second grid, the first grid operating at a first power wattage and a first electrical frequency and the second grid operating at a second electrical frequency, the system comprising:

a rotatable shaft;

a drive motor connected to the rotatable shaft to drive the shaft proportional to power compensation between the first and second grids;

a rotor assembly having a rotor connected with the rotatable shaft on a first side of the drive motor connection to the rotatable shaft, the rotor assembly having rotor end windings extending axially from opposing ends of the rotor with the first rotor end windings axially positioned adjacent the drive motor and with the second rotor end windings axially positioned remote from the drive motor;

a stator assembly surrounding the rotor and having stator windings electrically connected with the second grid;

a slip ring assembly mounted to the rotatable shaft and being electrically connected to the first grid; and, a bus duct assembly mounted within the rotatable shaft comprising three phases of isolated bus duct where each phase of isolated bus comprises an interior bus conductor surrounded by an outer housing, the bus duct assembly extending along the rotatable shaft between the slip ring assembly and the second rotor end windings positioned remote from the drive motor to electrically interconnect the slip ring assembly to the second rotor end windings positioned remote from the drive motor, and the bus duct assembly comprising first end leads extending through openings in the shaft axially adjacent the second rotor end windings positioned remote from the drive motor for connection with the second rotor end windings.

12. The rotary transformer system of claim 11 wherein the first end leads extend radially on the same plane through the openings in the shaft.

13. The rotary transformer system of claim 11 wherein the slip ring assembly is mounted to the rotatable shaft on a second side of the drive motor connection to the shaft opposite to the first side and wherein the bus duct extends through the shaft and the connection of the drive motor to the shaft.

14. The rotary transformer system of claim 13 wherein the bus duct assembly further includes second end leads radially extending through openings in the rotatable shaft on the second side of the drive motor for connection with the slip ring assembly.

15. The rotary transformer system of claim 11 wherein the bus duct has a tubular shape.

16. The rotary transformer system of claim 11 wherein the rotatable shaft comprises at least first and second axially extending shaft sections coupled together to form said shaft, and wherein:

the slip ring assembly is connected to the first shaft section;

the rotor is connected to the second shaft section; and the bus duct assembly includes first and second bus duct sections axially extending substantially within the first and second shaft sections, each of the first and second bus duct sections being interconnected within one of the shaft sections.

17. The rotary transformer system of claim 16 wherein one of the first and second bus duct sections extends beyond its corresponding shaft section into the other shaft section such that the bus duct interconnection is located in one of the first and second shaft sections.

18. The rotary transformer system of claim 17 wherein the first and second bus duct sections are L shaped sections whose corresponding first and second end leads are respectively mounted through a corresponding set of exit holes in the corresponding first or second shaft sections.

19. The rotary transformer system of claim 16 wherein the shaft sections are coupled together in combination with the drive motor connection to the shaft.

20. The rotary transformer system of claim 16 wherein the shaft sections are coupled together in close axial proximity to the bus duct interconnection.

* * * * *